US011219070B2

(12) United States Patent
Park et al.

(10) Patent No.: US 11,219,070 B2
(45) Date of Patent: Jan. 4, 2022

(54) VARIABLE RANDOM ACCESS CHANNEL (RACH) SIGNATURE MAPPING

(71) Applicant: QUALCOMM Incorporated, San Diego, CA (US)

(72) Inventors: Sungwoo Park, San Diego, CA (US); Makesh Pravin John Wilson, San Diego, CA (US); Vinay Chande, San Diego, CA (US); Tao Luo, San Diego, CA (US); Jing Sun, San Diego, CA (US); Xiaoxia Zhang, San Diego, CA (US); Arumugam Chendamarai Kannan, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 16/795,281

(22) Filed: Feb. 19, 2020

(65) Prior Publication Data

US 2020/0275493 A1 Aug. 27, 2020

Related U.S. Application Data

(60) Provisional application No. 62/808,654, filed on Feb. 21, 2019.

(51) Int. Cl.
*H04W 74/08* (2009.01)
*H04W 56/00* (2009.01)
(Continued)

(52) U.S. Cl.
CPC ....... *H04W 74/0833* (2013.01); *H04L 1/1614* (2013.01); *H04W 56/001* (2013.01);
(Continued)

(58) Field of Classification Search
CPC ......... H04W 74/0833; H04W 74/0891; H04W 72/046; H04W 56/001; H04W 16/28; H04B 7/0695; H04L 1/1614
See application file for complete search history.

(56) References Cited

U.S. PATENT DOCUMENTS

2018/0324865 A1* 11/2018 Hui ................... H04W 74/006
2018/0368189 A1* 12/2018 Narasimha .......... H04W 56/001
(Continued)

FOREIGN PATENT DOCUMENTS

WO 2018182283 A1 10/2018

OTHER PUBLICATIONS

Nokia Siemens Networks, Nokia; "Flexible RACH signature number"; 3GPP TSG RAN WG1 Meeting #49bis Orlando, USA, Jun. 25-29, 2007 (Year: 2007).*

(Continued)

*Primary Examiner* — Gary Mui
(74) *Attorney, Agent, or Firm* — Harrity & Harrity LLP/Qualcomm Incorporated

(57) ABSTRACT

Various aspects of the present disclosure generally relate to wireless communication. In some aspects, a user equipment (UE) may select a random access channel (RACH) signature from among one or more RACH signatures associated with a synchronization signal block (SSB). The UE may transmit, to a base station (BS), a RACH communication using the selected RACH signature. Numerous other aspects are provided.

30 Claims, 11 Drawing Sheets

(51) Int. Cl.
*H04W 76/27* (2018.01)
*H04W 72/04* (2009.01)
*H04L 1/16* (2006.01)

(52) U.S. Cl.
CPC ..... *H04W 72/046* (2013.01); *H04W 74/0891* (2013.01); *H04W 76/27* (2018.02)

(56) References Cited

U.S. PATENT DOCUMENTS

| | | | |
|---|---|---|---|
| 2019/0069258 A1* | 2/2019 | Jeon | H04W 48/20 |
| 2019/0150190 A1* | 5/2019 | Kim | H04W 74/0833 370/329 |
| 2019/0215790 A1* | 7/2019 | Kim | H04L 27/26025 |
| 2019/0312619 A1* | 10/2019 | Abedini | H04B 17/382 |
| 2020/0236707 A1* | 7/2020 | Jose | H04W 74/08 |
| 2020/0245157 A1* | 7/2020 | Chande | H04W 56/001 |
| 2020/0275479 A1* | 8/2020 | Peisa | H04W 74/008 |
| 2020/0322949 A1* | 10/2020 | Akkarakaran | H04W 74/0833 |
| 2020/0337002 A1* | 10/2020 | Ko | H04W 56/001 |
| 2020/0367224 A1* | 11/2020 | Persson | H04W 72/046 |
| 2020/0374943 A1* | 11/2020 | Sun | H04W 74/0833 |
| 2021/0068157 A1* | 3/2021 | Auslender | H04W 74/0833 |

OTHER PUBLICATIONS

Ericsson: "4-Step Random Access Procedure", 3GPP Draft, 3GPP TSG-RAN WG1 NR Ad-Hoc#2, R1-1711383_4-Step Random Access Procedure, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 17, 2017 (Jun. 17, 2017), XP051305543, pp. 1-18, Retrieved from the internet: URL: http://www.3gpp.org/ftp/tsg_ran/WG1_RL1/TSGR1_AH/NR_AH_1706/Docs/, [retrieved on Jun. 17, 2017], figure 1.
International Search Report and Written Opinion—PCT/US2020/019033—ISAEPO—dated May 12, 2020.

* cited by examiner

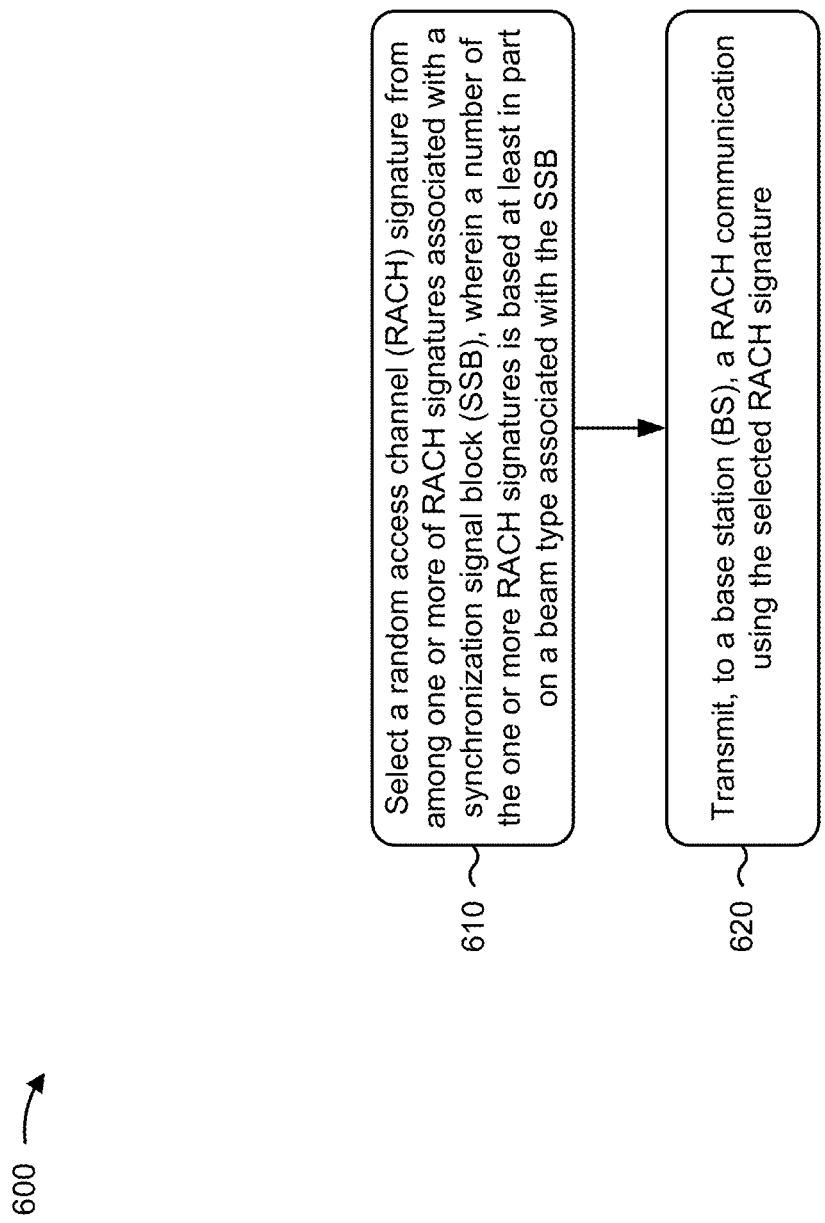

VARIABLE RANDOM ACCESS CHANNEL (RACH) SIGNATURE MAPPING

CROSS-REFERENCE TO RELATED APPLICATION

This application claims priority to U.S. Provisional Application No. 62/808,654, filed on Feb. 21, 2019, entitled "VARIABLE RANDOM ACCESS CHANNEL (RACH) SIGNATURE MAPPING," which is hereby expressly incorporated by reference herein.

FIELD OF THE DISCLOSURE

Aspects of the present disclosure generally relate to wireless communication, and more particularly to techniques and apparatuses for variable random access channel (RACH) signature mapping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, further improvements in LTE and NR technologies remain useful. Preferably, these improvements should be applicable to other multiple access technologies and the telecommunication standards that employ these technologies.

SUMMARY

In some aspects, a method of wireless communication, performed by a user equipment (UE), may include selecting a random access channel (RACH) signature from among one or more RACH signatures associated with a synchronization signal block (SSB), wherein a number of the one or more RACH signatures is based at least in part on a beam type associated with the SSB. The method may include transmitting, to a base station (BS), a RACH communication using the selected RACH signature.

In some aspects, a UE for wireless communication may include memory and one or more processors operatively coupled to the memory. The memory and the one or more processors may be configured to select a RACH signature from among one or more RACH signatures associated with an SSB, wherein a number of the one or more RACH signatures is based at least in part on a beam type associated with the SSB. The memory and the one or more processors may be configured to transmit, to a BS, a RACH communication using the selected RACH signature.

In some aspects, a non-transitory computer-readable medium may store one or more instructions for wireless communication. The one or more instructions, when executed by one or more processors of a UE, may cause the one or more processors to select a RACH signature from among one or more RACH signatures associated with an SSB, wherein a number of the one or more RACH signatures is based at least in part on a beam type associated with the SSB. The one or more instructions, when executed by the one or more processors, may cause the one or more processors to transmit, to a BS, a RACH communication using the selected RACH signature.

In some aspects, an apparatus for wireless communication may include means for selecting a RACH signature from among one or more RACH signatures associated with an SSB, wherein a number of the one or more RACH signatures is based at least in part on a beam type associated with the SSB. The apparatus may include means for transmitting, to a BS, a RACH communication using the selected RACH signature.

In some aspects, a method of wireless communication, performed by a BS, may include transmitting a plurality of SSBs. The method may include transmitting a signaling communication that indicates respective sets of one or more RACH signatures associated with the plurality of SSBs, wherein a number of a set of one or more RACH signatures associated with an SSB of the plurality of SSBs is based at least in part on a beam type associated with the SSB.

In some aspects, a BS for wireless communication may include memory and one or more processors operatively coupled to the memory. The memory and the one or more processors may be configured to transmit a plurality of SSBs. The memory and the one or more processors may be configured to and transmit a signaling communication that indicates respective sets of one or more RACH signatures associated with the plurality of SSBs, wherein a number of a set of one or more RACH signatures associated with an SSB of the plurality of SSBs is based at least in part on a beam type associated with the SSB.

In some aspects, a non-transitory computer-readable medium may store one or more instructions for wireless communication. The one or more instructions, when executed by one or more processors of a B S, may cause the one or more processors to transmit a plurality of SSBs. The one or more instructions, when executed by the one or more processors, may cause the one or more processors to transmit a signaling communication that indicates respective sets of one or more RACH signatures associated with the plurality of SSBs, wherein a number of a set of one or more RACH signatures associated with an SSB of the plurality of SSBs is based at least in part on a beam type associated with the SSB.

In some aspects, an apparatus for wireless communication may include means for transmitting a plurality of SSBs. The apparatus may include means for transmitting a signaling communication that indicates respective sets of one or more RACH signatures associated with the plurality of SSBs, wherein a number of a set of one or more RACH signatures associated with an SSB of the plurality of SSBs is based at least in part on a beam type associated with the SSB.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 6 is a diagram illustrating an example process performed, for example, by a UE, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
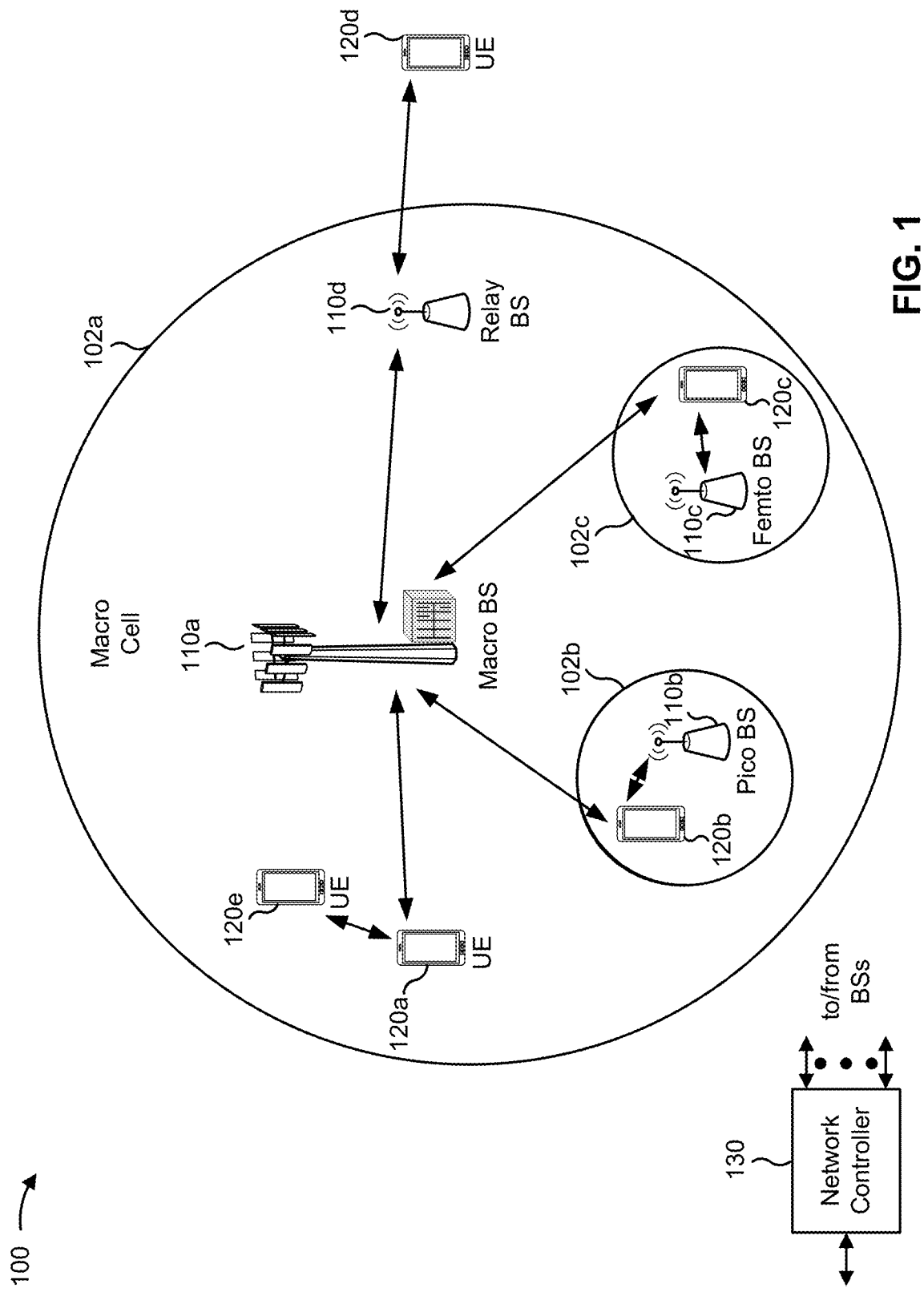
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
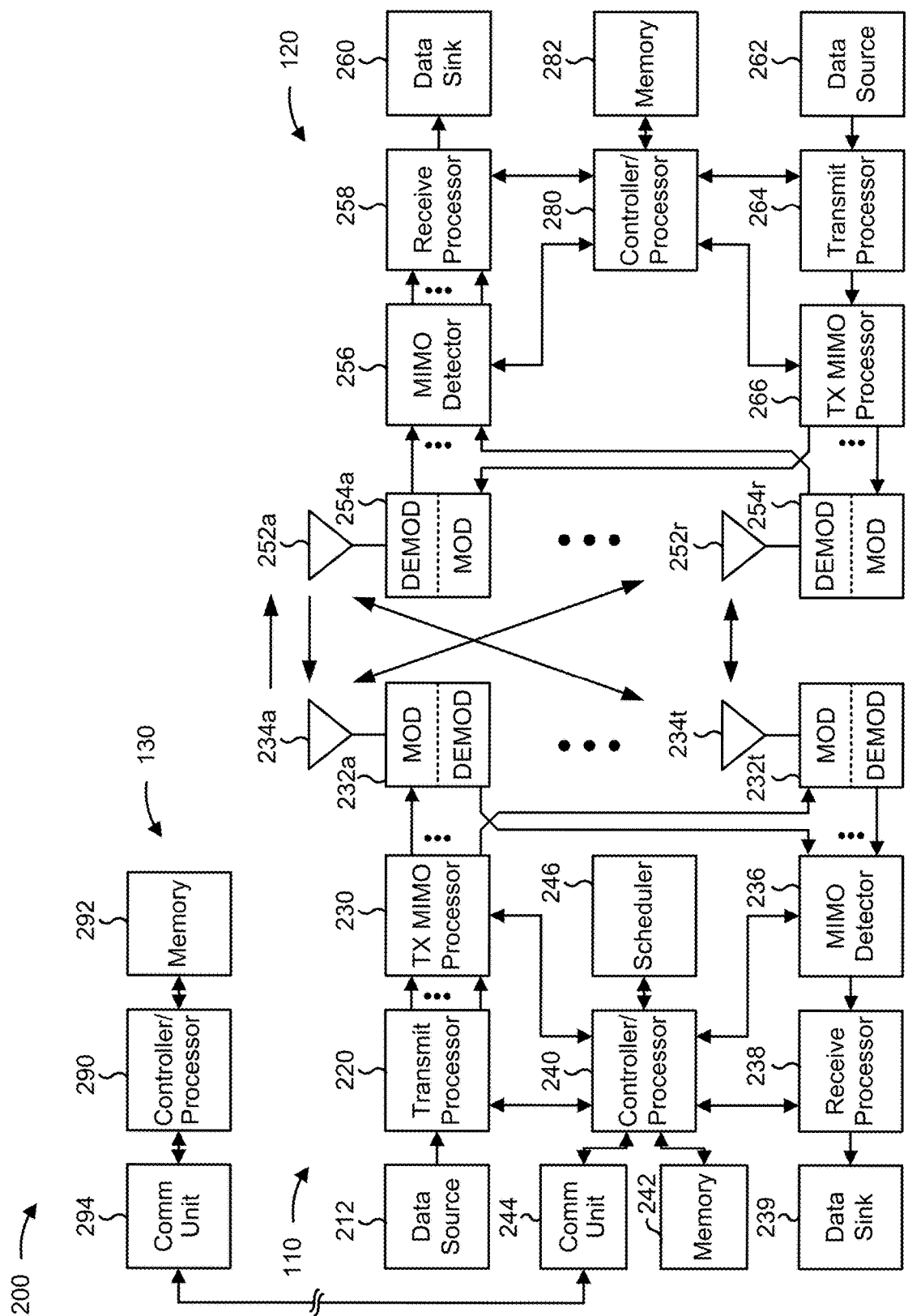
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators (MODs) 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with variable random access channel (RACH) signature mapping, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. As such, memory 282 of the UE can comprise a non-transitory computer-readable medium storing one or more instructions for wireless communication, where the one or more instructions comprise one or more instructions that, when executed by one or more processors (e.g., receive processor 258, transmit processor 264, and/or controller/processor 280) of the UE 120, cause the one or more processors to perform the method described in greater detail with reference to FIGS. 5A-5D, 6, and/or 6. Moreover, memory 242 of the BS can comprise a non-transitory computer-readable medium storing one or more instructions for wireless communication, where the one or more instructions comprise one or more instructions that, when executed by one or more processors (e.g., transmit processor 220, receive processor, 238, and/or controller/processor 240) of the BS 110, cause the one or more processors to perform the method described in greater detail with reference to FIGS. 5A-5D, 6, and/or 6. A scheduler 246 may schedule UEs for data transmission on the downlink and/or uplink.

In some aspects, UE 120 may include means for selecting a RACH signature from among one or more RACH signatures associated with a synchronization signal block (SSB), wherein a number of the one or more RACH signatures is based at least in part on a beam type associated with the SSB (e.g., using receive processor 258, transmit processor 264, controller/processor 280, memory 282, and/or the like), means for transmitting, to a BS 110, a RACH communication using the selected RACH signature (e.g., using memory 282, controller/processor 280, transmit processor 264, TX MIMO processor 266, MOD 254, antenna 252, and/or the like), and/or the like.

In some aspects, base station 110 may include means for transmitting a plurality of SSBs (e.g., using memory 242, controller/processor 240, transmit processor 220, TX MIMO processor 230, MOD 232, antenna 234, and/or the like), means for transmitting a signaling communication that indicates respective sets of one or more RACH signatures associated with the plurality of SSBs, wherein a number of a set of one or more RACH signatures associated with an SSB of the plurality of SSBs is based at least in part on a beam type associated with the SSB (e.g., using memory 242, controller/processor 240, transmit processor 220, TX MIMO processor 230, MOD 232, antenna 234, and/or the like), and/or the like.

As indicated above, FIG. 2 is provided as an example. Other examples may differ from what is described with regard to FIG. 2.

Figure 3A:
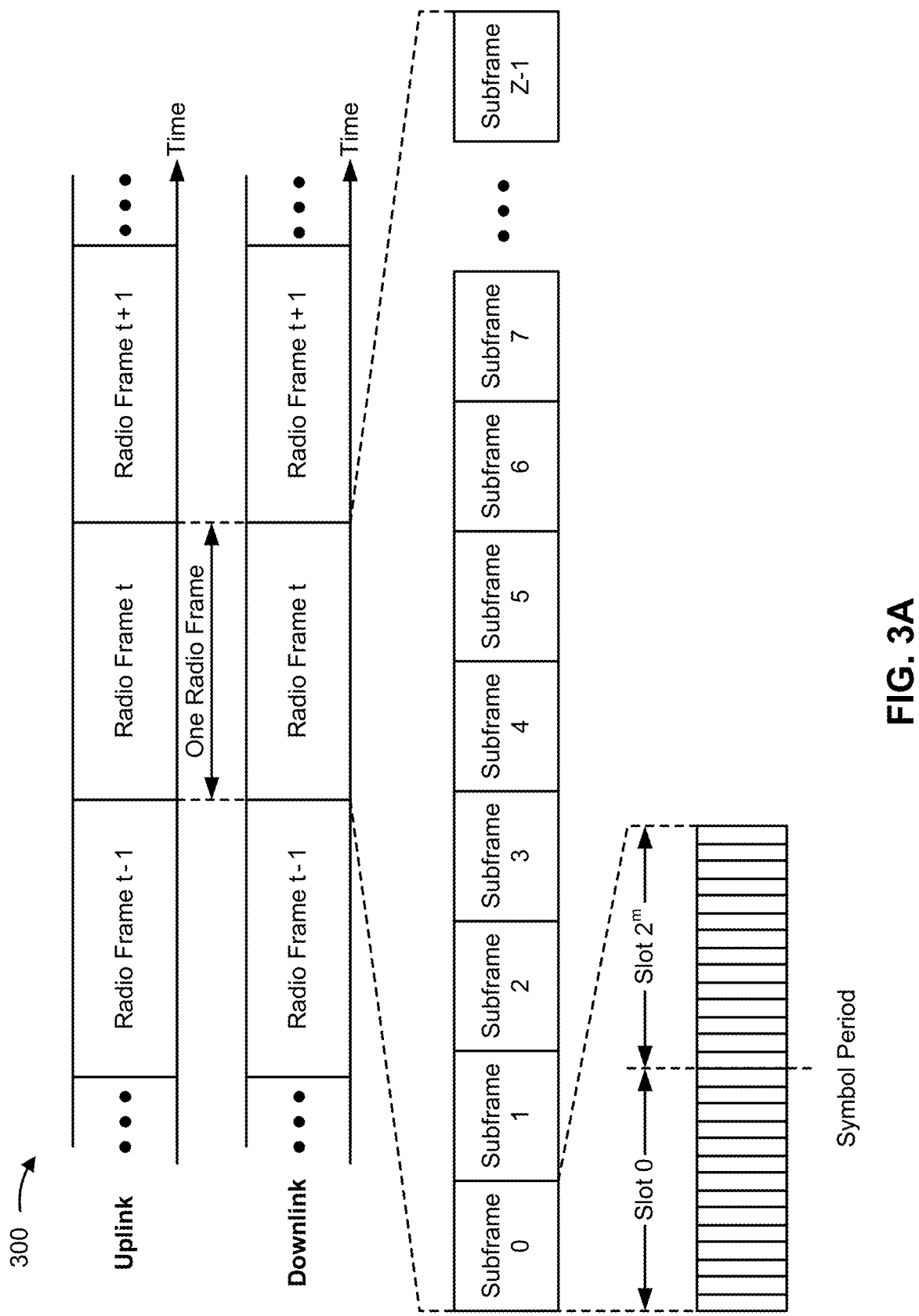
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
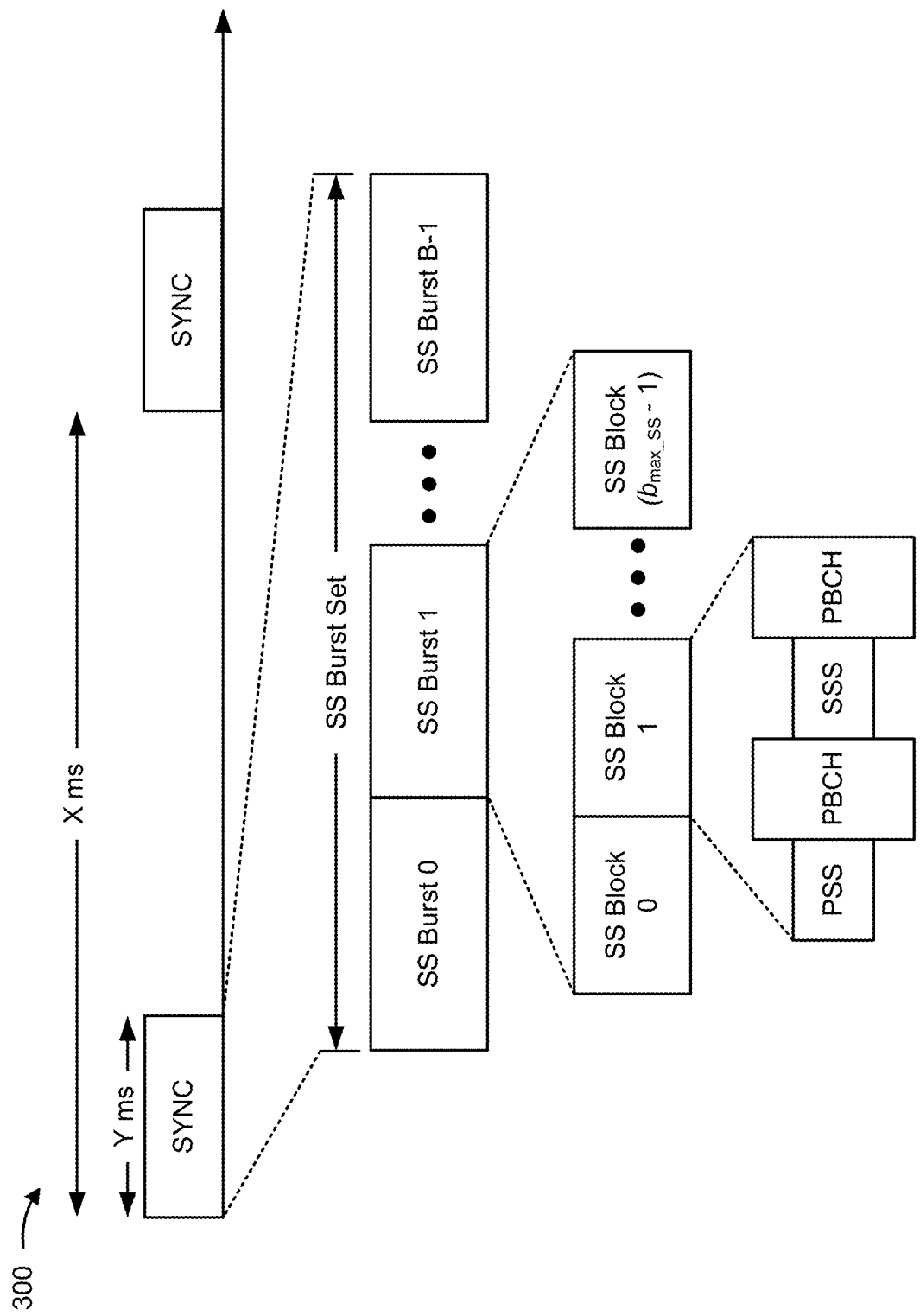
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
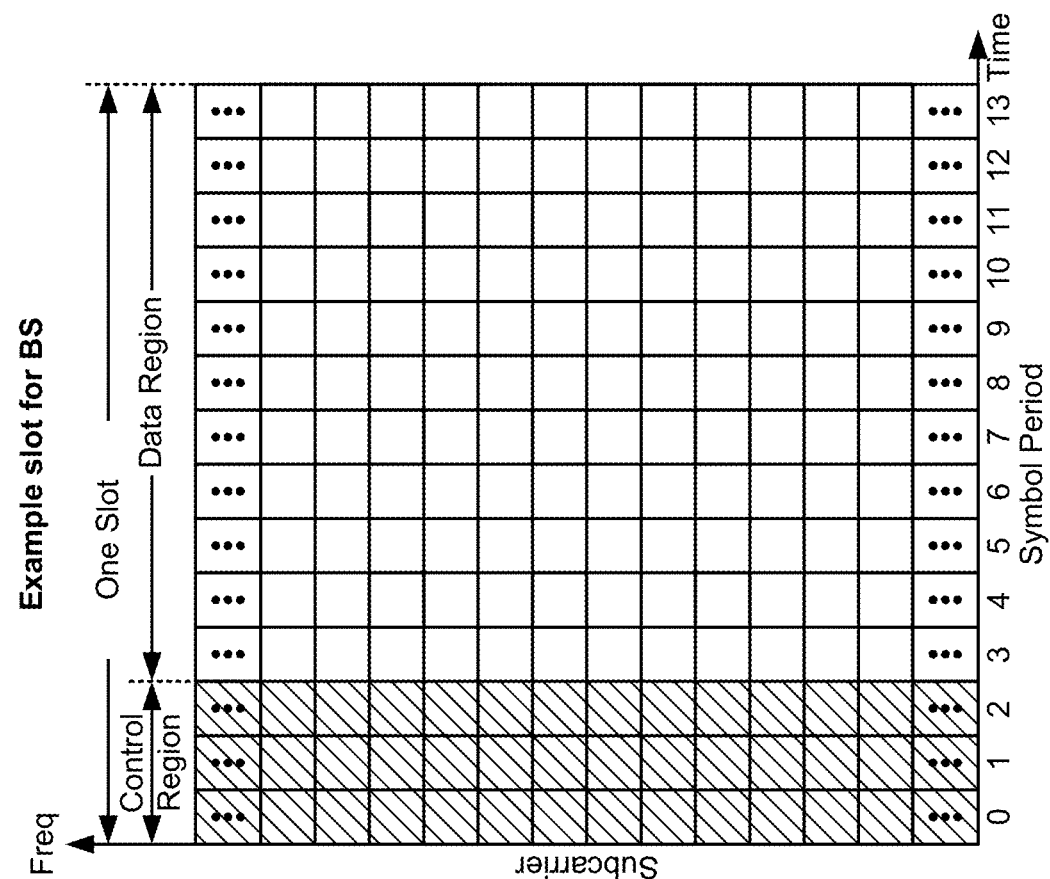
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

A UE may access a wireless network by negotiating a connection with a BS included in the wireless network. During connection establishment, the UE and the BS may synchronize the connection in the downlink direction (that is, from BS to UE) and in the uplink direction (that is, from UE to BS).

To synchronize the connection in the downlink direction, the UE may read an SSB that includes various synchronization signals transmitted from the BS. The synchronization signals may include a PSS, an SSS, and/or the like. The UE may use the PSS to determine symbol timing in the downlink direction, and may use the SSS to determine a physical cell identifier, associated with the BS, and frame timing.

To synchronize the connection in the uplink direction, the UE and the BS may perform a RACH procedure. In some aspects, the UE and the BS may perform a four-step RACH procedure. In a four-step RACH procedure, the UE and the BS may exchange four primary RACH communications. The UE may transmit a msg1 communication to the BS. The msg1 communication may include a RACH preamble communication. The BS may respond to the msg1 communication with a msg2 communication, which may include a random access response (RAR) communication. The UE may respond to the msg2 communication with a msg3 communication, which may include a radio resource control (RRC) connection request communication. The BS may respond to the msg3 communication with a msg4 communication, which may include a medium-access-control control element (MAC-CE) contention resolution identifier, an RRCSetup command, and/or the like.

In some cases, the four-step RACH procedure may not meet the low latency requirements of 5G/NR wireless systems. Accordingly, the UE and the BS may use a two-step RACH procedure to reduce latency in synchronizing the connection in the uplink direction. In a two-step RACH procedure, the UE may combine the msg1 communication and the msg3 communication into a communication referred to as a msgA communication. The msg1 portion of the msgA communication may be referred to as the preamble portion of the msgA communication. The msg3 portion of the msgA communication may be referred to as the payload portion of the msgA. The UE may transmit the msg1 portion and the msg3 portion sequentially and prior to receiving the msg2 communication and the msg4 communication. The BS may receive the msgA communication and may transmit a msgB communication, which may include the msg2 communication and the msg4 communication.

In some cases, the UE may transmit an uplink RACH communication (e.g., a msg1 communication in a four-step RACH procedure, a preamble portion of a msgA communication, and/or the like) using a RACH signature. A RACH signature may include a combination of a RACH preamble (e.g., a Zadoff-Chu sequence and/or another type of sequence) and a RACH occasion (e.g., an uplink time domain resource and an uplink frequency domain resource). The UE may select a RACH signature for transmitting the RACH communication by selecting an SSB associated with a beam transmitted from the BS, selecting a RACH occasion associated with the SSB, and selecting a RACH preamble from a plurality of available RACH preambles in the RACH occasion.

In some cases, the BS may transmit various types of beams, such as wide beams, narrow beams, vertical beams (beams having a relatively large elevation width and a relatively small azimuthal width), horizontal beams (beams having a relatively large elevation width and a relatively large azimuthal width), symmetric beams (beams having similar widths in both elevation and azimuth), varying widths of wide beams and/or narrow beams, and/or the like. However, the number of RACH signatures associated with an SSB may be the same regardless of the beam type of the beam associated with the SSB, which may result in an inefficient distribution of RACH signatures and/or an increased number of RACH preamble collisions. As an example, a wide beam may serve a greater number of UEs, in a cell associated with the BS, than a narrow beam due to the directional nature of the narrow beam. If an SSB associated with the wide beam, and an SSB associated with the narrow beam, are assigned the same number of RACH signatures, UEs being served by the wide beam may experience a greater number of RACH preamble collisions due to the greater number of UEs being served by the wide beam, whereas the narrow beam may experience lower utilization of RACH preambles due to the lesser number of UEs being served by the narrow beam.

Some aspects, described herein, provide techniques and apparatuses for variable RACH signature mapping. In some aspects, a BS may transmit a plurality of SSBs. Each SSB may be associated with a respective beam transmitted from the BS. The beam may be associated with a beam type. The BS may transmit a signaling communication that indicates respective sets of one or more RACH signatures associated with the plurality of SSBs. For example, for a given SSB, say SSB1, one or more RACH signatures may be defined or determined, for example, {RACHsig1_1, RACHsig1_2, ..., RACHsig1_m} while for another SSB, say SSB2, another one or more RACH signatures may be defined or determined, for example, {RACHsig2_1, RACHsig2_2, ..., RACHsig2_n}, where m and n are integers which can be different. Additionally, for further given SSBs, respective sets of one or more RACH signatures may also be defined or determined. The number of RACH signatures (integers m and n in the examples of SSB1 and SSB2 just discussed) for the one or more RACH signatures associated with an SSB may be based at least in part on a beam type of a beam associated with the SSB. In the example just discussed, the integer value of m may be based at least in part on a beam type of a beam associated with SSB1 and the integer value of n may be based at least in part on a beam type of a beam associated with SSB2. In this way, the number of RACH signatures associated with a particular SSB may be variable based at least in part on a beam type of a beam associated with the SSB. This may permit the BS to more flexibly and efficiently assign RACH signatures to SSB, which may decrease RACH preamble collisions and/or increase utilization of RACH preambles.

FIGS. 5A-5D are diagrams illustrating an example 500 of variable RACH signature mapping, in accordance with various aspects of the present disclosure. As shown in FIGS. 5A-5D, example 500 may include communications between a user equipment (e.g., UE 120) and a base station (e.g., BS 110). In some aspects, BS 110 and UE 120 may be included in a wireless network (e.g., wireless network 100).

In some aspects, BS 110 and UE 120 may establish a connection using a RACH procedure, such as a four-step RACH procedure, a two-step RACH procedure, and/or the like. For example, UE 120 may initiate the RACH procedure by transmitting, to BS 110, a RACH communication. The RACH communication may include a msg1 communication in a four-step RACH procedure, a msgA communication in the two-step RACH procedure, and/or the like. In some aspects, UE 120 may select a RACH signature (e.g., a RACH occasion and a RACH preamble in the RACH occasion) for the RACH communication. The RACH signature may be used to uniquely identify UE 120 during the RACH procedure.

Figure 5A:
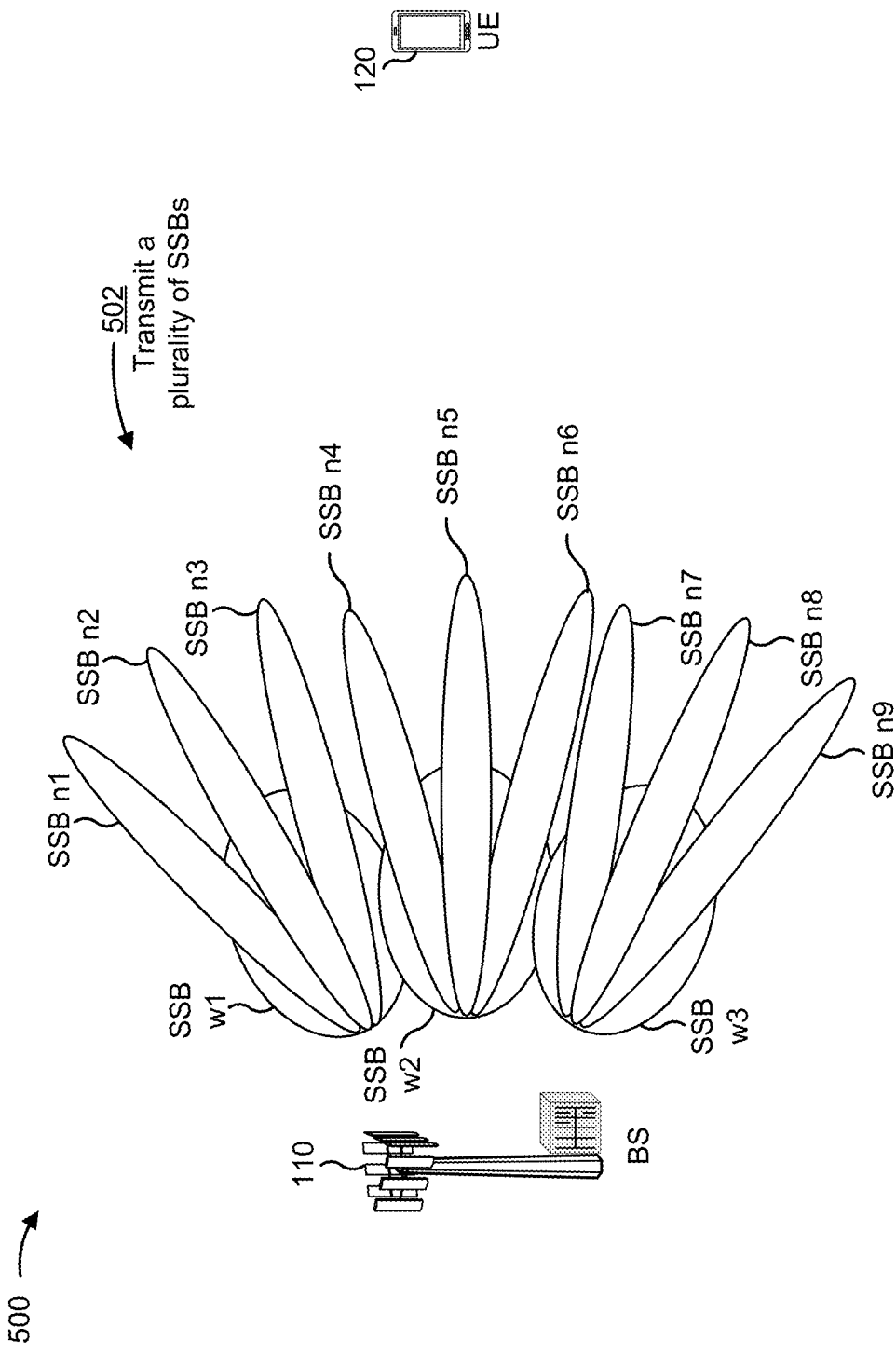
FIGS. 5A-5D are diagrams illustrating one or more examples of variable random access channel (RACH) signature mapping, in accordance with various aspects of the present disclosure.

As shown in FIG. 5A, and by reference number 502, BS 110 may transmit a plurality of SSBs on respective beams (e.g., SSB n1 through SSB n9, SSB w1 through SSB w3, and/or the like). UE 120 may select an SSB, of the plurality of SSBs, and may select a RACH signature, for the RACH communication, based at least in part on the selected SSB.

In some aspects, UE 120 may select the SSB based at least in part on various factors and/or criteria. As an example, UE 120 may perform one or more measurements associated with the plurality of SSBs and may select the SSB that produces the best measurement results, the best combination of measurement results, the best average measurement results, and/or the like. The one or more measurements may include a received signal strength indication (RSSI) measurement, a reference signal received power (RSRP) measurement, a reference signal received quality (RSRQ) measurement, a latency measurement, a signal-to-noise (SNR) measurement, a signal-to-interference-plus-noise (SINR) measurement, and/or the like.

The plurality of SSBs may be each associated with respective beam types or sets of beam types (e.g., wide beams, narrow beams, vertical beams, horizontal beams, symmetric beams, and/or the like). In one particular example, the beam type may be one of a plurality of beam types, each of the plurality of beam types associated with a beam width different from a beam width associated with any other beam type of the plurality of beam types. As an example, the plurality of beam types may include a first beam type associated with a narrow beam having a beam width in a given dimension, a second beam type associated with a wider beam having a beam width in the given dimension larger than the beam width of the narrow beam in the given dimension, a third beam type associated with a widest beam having a beam width in the given dimension larger than the beam width of the wider beam in the given dimension, and/or the like. As another example, the plurality of beam types may include greater or fewer number of beam types associated with varying beam widths. The different beam widths can be in a given dimension, for example, such that each of the plurality of beam types is associated with a beam width in the given dimension (for example, each of the beam types is associated with a beam width in elevation or associated with a beam width in azimuth). Moreover, the different beam widths may be associated with different numbers of RACH signatures. For example, building on the example above, the beam type associated with the narrow beam may be associated with a first number of RACH signatures (e.g., 4 RACH signatures), the beam type associated with the wider beam may be associated with a second number of RACH signatures (e.g., 5 RACH signatures), the beam type associated with the widest beam may be associated with a third number of RACH signatures (e.g., 6 RACH signatures), and so on, and/or the like. In such an example, wider beams have more RACH signatures than narrow beams such that the third number is greater than the second number and the second number is greater than the first number. In an alternative example, the beam type associated with the narrow beam may be associated with a first number of RACH signatures (e.g., 5 RACH signatures), the beam type associated with the wider beam may be associated with a second number of RACH signatures (e.g., 4 RACH signatures), the beam type associated with the widest beam may be associated with a third number of RACH signatures (e.g., 3 RACH signatures), and so on, and/or the like. In such an example, wider beams have fewer RACH signatures than narrow beams such that the first number is greater than the second number and the second number is greater than the third number. It is understood that these examples of numbers of RACH signatures are merely illustrative.

Additionally or alternatively, some of the different beam widths can be in different dimensions, such that, for example, one of the beam types can be a horizontal beam that is relatively wide in azimuth and narrow in elevation, while another of the beam types can be a vertical beam that is equally wide in elevation as the horizontal beam is wide in azimuth and is equally narrow in azimuth as the horizontal beam is narrow in elevation. As such, the horizontal beam and vertical beam, despite having similar beam widths, would be considered two different beam types as the horizontal beam and vertical beam are rotated relative to each other. Rotations other than 90 degrees (as in the example of a vertical versus horizontal beam) between beams of different types are also possible. Additionally, although the above example of the horizontal beam rotated relative to the vertical beam was discussed in the context of beams of similar width but simply rotated, it is understood that some of the beam types can include any combination of different or similar beam widths in different or similar dimensions (for example, in elevation and/or azimuth).

In some aspects, an SSB may be associated with a beam type of the beam on which the SSB is transmitted. For example, SSB n2 may be transmitted on a narrow beam and thus may be associated with a narrow-beam beam type. As another example, SSB w3 may be transmitted on a wide beam and thus may be associated with a wide-beam beam type. As another example, SSB n3 may be transmitted on a beam that is a narrow beam and a horizontal beam. Accordingly, SSB n3 may be associated with a narrow horizontal beam type.

In some aspects, such as in a licensed assisted access (LAA) case, the beam associated with an SSB may have a close relationship between the beam associated with other SSBs. For example, the beam associated with SSB w2 may have high correlation between the beams associated with SSB w1, SSB w3, SSB n4, SSB n5, and SSB n6, which may be referred to as SSB request groups of SSB w2. In this case, SSB w2 may be associated with a set of beam types that includes the beam type associated with the beam on which SSB w2 is transmitted, and the respective beam types associated with the respective beams on which SSB w1, SSB w3, SSB n4, SSB n5, and SSB n6 are transmitted.

Figure 5B:
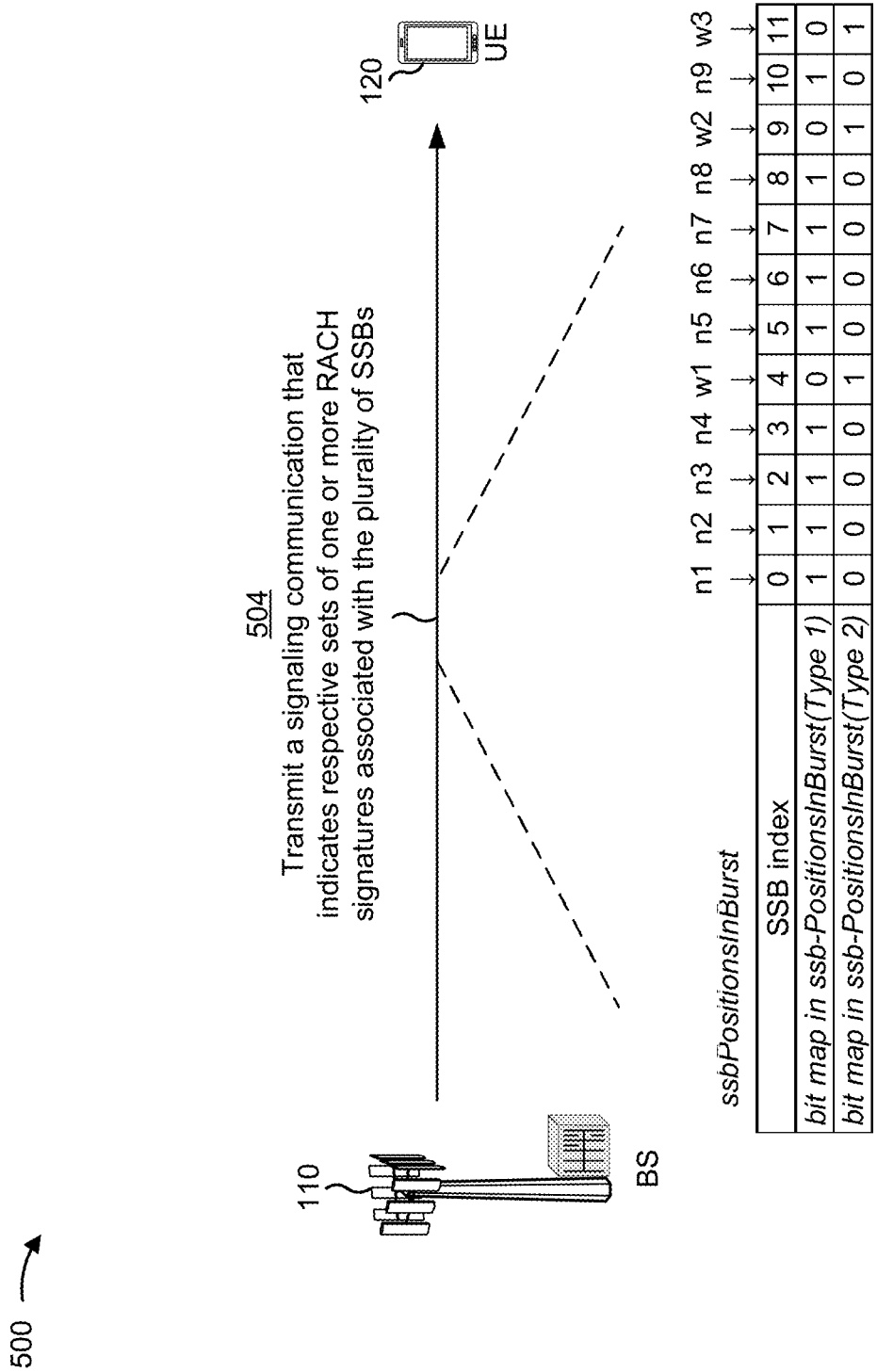

As shown in FIG. 5B, and by reference number 504, BS 110 may transmit a signaling communication that indicates respective sets of one or more RACH signatures associated with the plurality of SSBs. In some aspects, the signaling communication may be unicasted, broadcasted, multicasted, and/or the like, to UE 120. The signaling communication may include a radio resource control (RRC) communication, a master information block (MIB), a system information block (SIB), a remaining minimum system information (RMSI) communication, an other system information (OSI) communication, and/or the like.

In some aspects, the number RACH signatures for an SSB may be based at least in part on a beam type (or set of beam types) associated with the SSB. For example, different beam types (or different combinations of beam types) may correspond to different numbers of RACH signatures. For example, SSB w1 may be associated with a wide-beam beam type and may therefore be associated with a first number of RACH signatures, whereas SSB n6 may be associated with a narrow-beam beam type and may therefore be associated with a second number of RACH signatures. The first number of RACH signatures may be different from the second number of RACH signatures. For example, the first number of RACH signatures may be greater than or less than the second number of RACH signatures.

In some aspects, the number of RACH signatures for an SSB may be based at least in part on a hierarchy or ranking within a particular beam type. For example, SSB w1, SSB w2, and SSB w3 may be associated with a wide-beam beam type. SSB w1 may be associated with the widest wide beam, SSB w2 may be associated with the second widest wide beam, and SSB w3 may be associated with the third widest wide beam. In this case, SSB w1 may be associated with the greatest number of RACH signatures for an SSB that is associated with a wide beam, SSB w2 may be associated the second greatest number of RACH signatures for an SSB that is associated with a wide beam, and SSB w3 may be associated with the third greatest number of RACH signatures for an SSB that is associated with a wide beam. Although the above (and subsequent) discussion may be made, for ease of explanation, with reference to a narrow-beam beam type and a wide-beam beam type, it is understood that other ways of identifying the beam types are possible. For example, a beam type may be identified by an index, such that the different beam types are identified as beam_type(1) (a first beam type), beam_type(2) (a second beam type), beam_type(3) (a third beam type), etc., or more generally, beam_type(i), where index i can be one of a plurality of possible integers that indicate different beam widths. In another example, and to generalize further, a beam type may be identified by two indices, where each index of the two indices indicates different beam widths in different dimensions, for example a first dimension, such as an elevation angle, and a second dimension, such as an azimuth angle. In such an example, the different beam types are identified as beam_type(1,1) (a first beam type), beam_type(1,2), beam_type(1,3), beam_type(2,1), etc., or more generally, beam_type(i, j) where each of indices i and j can be one of a plurality of possible integers that indicate different beam widths in a respective dimension. Even further, the beam type may also be identified by, for example, three indices, a first index indicating a beam width in a first dimension, a second index indicating a beam width in a second dimension, and a third index indicating a rotation of the beam. As discussed elsewhere herein, the number of RACH signatures can be based on the beam type associated with an SSB such that different beam types have different numbers of RACH signatures. For example a first beam type has a first number of RACH signatures, a second beam type has a second number of RACH signatures, and a third beam type has a third number of RACH signatures, where the first, second, and third RACH numbers are all different numbers.

In some aspects, in an LAA case, the number of RACH signatures for an SSB may be further based at least in part on a number of SSB request groups associated with the SSB. For example, an SSB that is associated with four SSB request groups may be associated with a greater number of RACH signatures relative to an SSB that is associated with three SSB request groups. Moreover, the number of RACH signatures for an SSB may be further based at least in part on beam types associated with the SSB request groups. For example, an SSB that is associated with two wide beam SSB request groups and one narrow beam SSB request group may be associated with a different number of RACH signatures (e.g., greater or fewer) relative to an SSB that is associated with one wide beam SSB request group and two narrow beam SSB request group.

In some aspects, the number of RACH signatures for an SSB may be further based at least in part on a number of UEs that are being served by the beam associated with the SSB, based at least in part on a number of UEs that are expected to be served by the beam, and/or the like. For example, the number of RACH signatures for the SSB may be increased as the number of UEs that are being served (and/or are expected to be served) by the beam increases, and may be decreased as the number of UEs that are being served (and/or are expected to be served) by the beam decreases.

In some aspects, the respective beam types (and thus, the respective numbers of RACH signatures), associated with the plurality of SSBs, may be indicated by a bitmap in the signaling communication. The bitmap may include an ssb-PositionsInBurst bitmap, in which each column represents a respective SSB index of the plurality of SSBs, and the rows of the bitmap may indicate which beam type (or set of beam types) is associated with a particular SSB. As an example, SSB n8 may correspond to SSB index 8, and a bit having a 1-value in the first row and eighth column of the bitmap may indicate that SSB n8 is associated with a Type 1 beam type (e.g., which may be a narrow-beam beam type). The SSB index, associated with an SSB, may indicate the time domain locations and the frequency domain locations, in an uplink radio frame, of the RACH occasions included in the RACH signatures for the SSB.

Figure 5C:
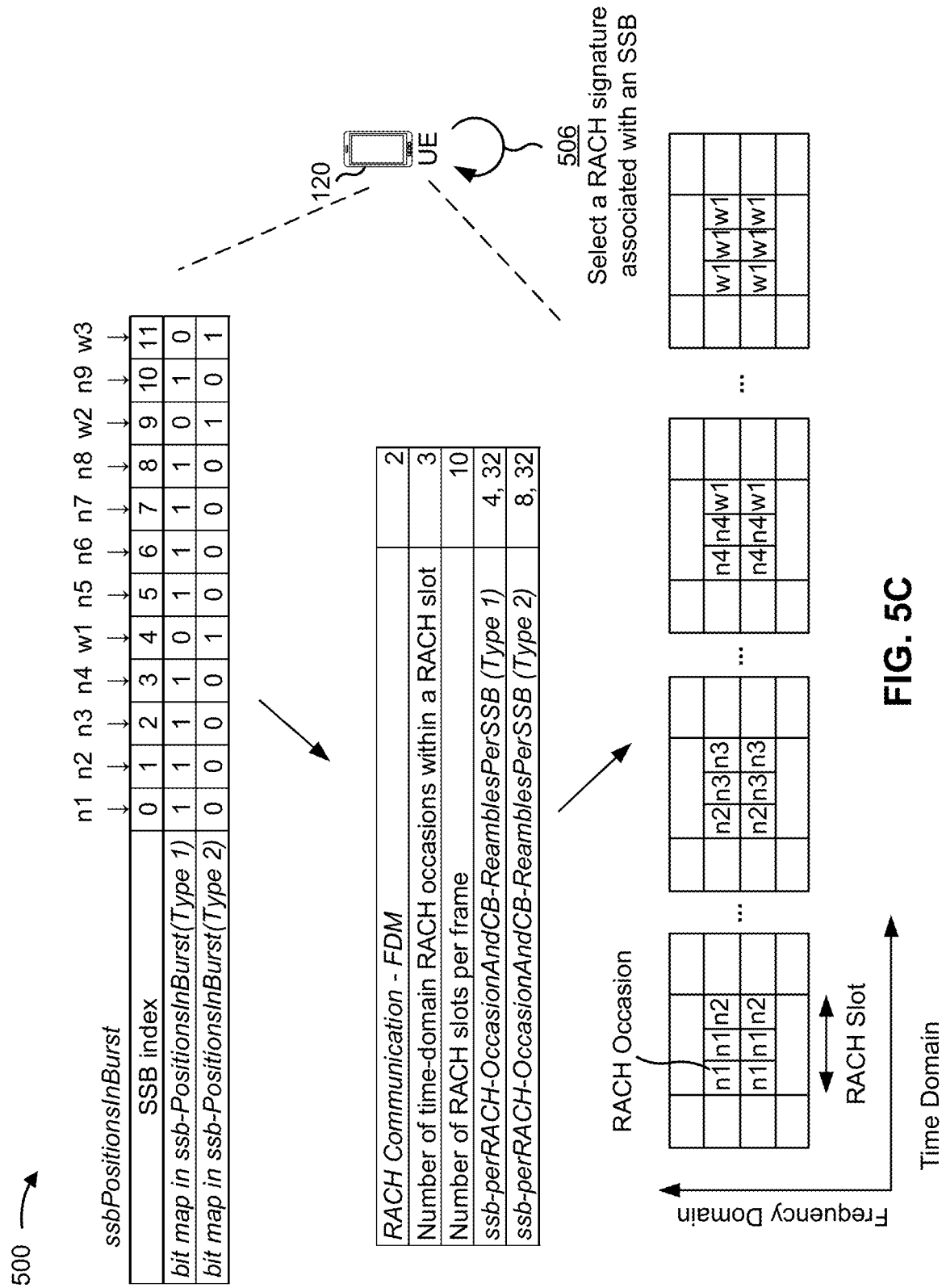

As shown in FIG. 5C, and as shown by reference number 506, UE 120 may select a RACH signature, of the one or more RACH signatures for the selected SSB, based at least in part on the signaling communication. In some aspects, to select the RACH signature, UE 120 may use the bitmap and a RACH configuration data structure to determine a RACH configuration of an uplink radio frame. The RACH configuration of the uplink radio frame may include one or more RACH occasions that are distributed across one or more RACH slots in the uplink radio frame. Each RACH occasion may be located at a particular time domain location and a particular frequency domain location in a RACH slot in the uplink radio frame. The SSB that is associated with a particular RACH occasion may be determined based at least in part on the bitmap and the RACH configuration data structure.

For example, the SSB indices may be sequentially assigned to the RACH occasions, included in the uplink radio frame, according to one or more RACH configuration parameters specified in the RACH configuration data structure. The RACH configuration data structure may include a table, a database, an electronic file, and/or the like, that is received UE 120 (e.g., from BS 110 and/or another source in the signaling communication and/or another signaling communication) or configured for UE 120 when UE 120 is deployed in the wireless network. The one or more RACH configuration parameters may include a frequency division multiplexing (FDM) parameter, a time division multiplexing (TDM) parameter, a RACH slot parameter, one or more beam type parameters, and/or the like.

The FDM parameter may specify how RACH slots are to be divided in the frequency domain. In the example shown in FIG. 5C, the FDM parameter (e.g., "RACH Communication—FDM") may specify that RACH slots are to be divided into two frequency domain locations for every time domain location. The TDM parameter may specify how RACH slots are to be divided in the time domain. In the example shown in FIG. 5C, the TDM parameter (e.g., "Number of time-domain RACH occasions within a RACH slot") may specify that RACH slots are to be divided into three time domain locations. RACH occasions may be located at the various time domain location and frequency location combinations included in a RACH slot.

The RACH slot parameter may specify the number of RACH slots that are included in an uplink radio frame. In the example shown in FIG. 5C, the RACH slot parameter (e.g., Number of RACH slots per frame") may specify that the number of RACH slots per uplink radio frame is to be ten. A beam type parameter may specify, for a particular beam type, the number of RACH occasions, in an uplink radio frame, that are to be assigned to an SSB of the particular beam type, and the number of RACH preambles that are available in each RACH occasion. In the example shown in FIG. 5C, a beam type parameter, for a Type 1 beam type, may specify that an SSB associated with the Type 1 beam type is to be assigned four RACH occasions in an uplink radio frame, and may specify that each RACH occasion assigned to the SSB is to include 32 RACH preambles.

UE 120 may determine the RACH configuration of an uplink radio frame by sequentially assigning SSBs to RACH occasions based at least in part on the SSB indices associated with the SSBs, and based at least in part on the one or more parameters specified in the RACH configuration data structure. For example, UE 120 may determine, based at least in part on the bitmap, that SSB n1 is associated with SSB index 0 and a Type 2 beam type, and may accordingly assign four RACH occasions to SSB n1. In some aspects, UE 120 may first assign RACH occasions across frequency domain locations and then time domain locations. For example, UE 120 may assign the two RACH occasions that occupy the two frequency domain locations in the first time domain location, in the first RACH slot, before proceeding to the next time domain location to assign RACH occasions. In some aspects, UE 120 may first assign RACH occasions across time domain locations and then frequency domain locations. For example, UE 120 may assign the three RACH occasions that occupy the three frequency domain locations in the first frequency domain location, in the first RACH slot, before proceeding to the next frequency domain location to assign RACH occasions. Once UE 120 has completed assigning RACH occasions to SSB n1, UE 120 may proceed to assign RACH occasions to SSB n2, and so on.

UE 120 may select the RACH signature, for the selected SSB, based at least in part on determining the RACH configuration for the uplink radio frame. For example, UE 120 may identify the SSB index associated with the selected SSB, which may be associated with a particular column in the bitmap. For example, if the selected SSB is SSB n4, UE 120 may determine that the SSB index, associated with SSB n4 (e.g., SSB index 3), corresponds to the fourth column in the bitmap. UE 120 may identify a bit having a 1-value in the fourth column of the bitmap to determine the beam type associated with the selected SSB. For example, UE 120 may determine the row in which the bit having the 1-value is located, which may correspond to the beam type associated with the SSB. In the example illustrated in FIG. 5C, the bit having a 1-value in the fourth column may be located in the first row of the bitmap, which may indicate that SSB n4 is associated with a Type 1 beam type (e.g., a narrow-beam beam type).

UE 120 may determine the one or more RACH signatures, associated with the selected SSB, based at least in part on the RACH configuration for the uplink radio frame. For example, UE 120 may determine, based at least in part on the RACH configuration, the locations of the one or more RACH occasions associated with the selected SSB, and may select a RACH occasion (e.g., may randomly select the RACH occasion, may select the first available RACH occasion in the time domain and frequency domain, or the like) from the one or more RACH occasions. UE 120 may then select a RACH preamble of the one or more RACH preambles available in the selected RACH occasion. The combination of the selected RACH occasion and the selected RACH preamble may be the selected RACH signature.

Figure 5D:
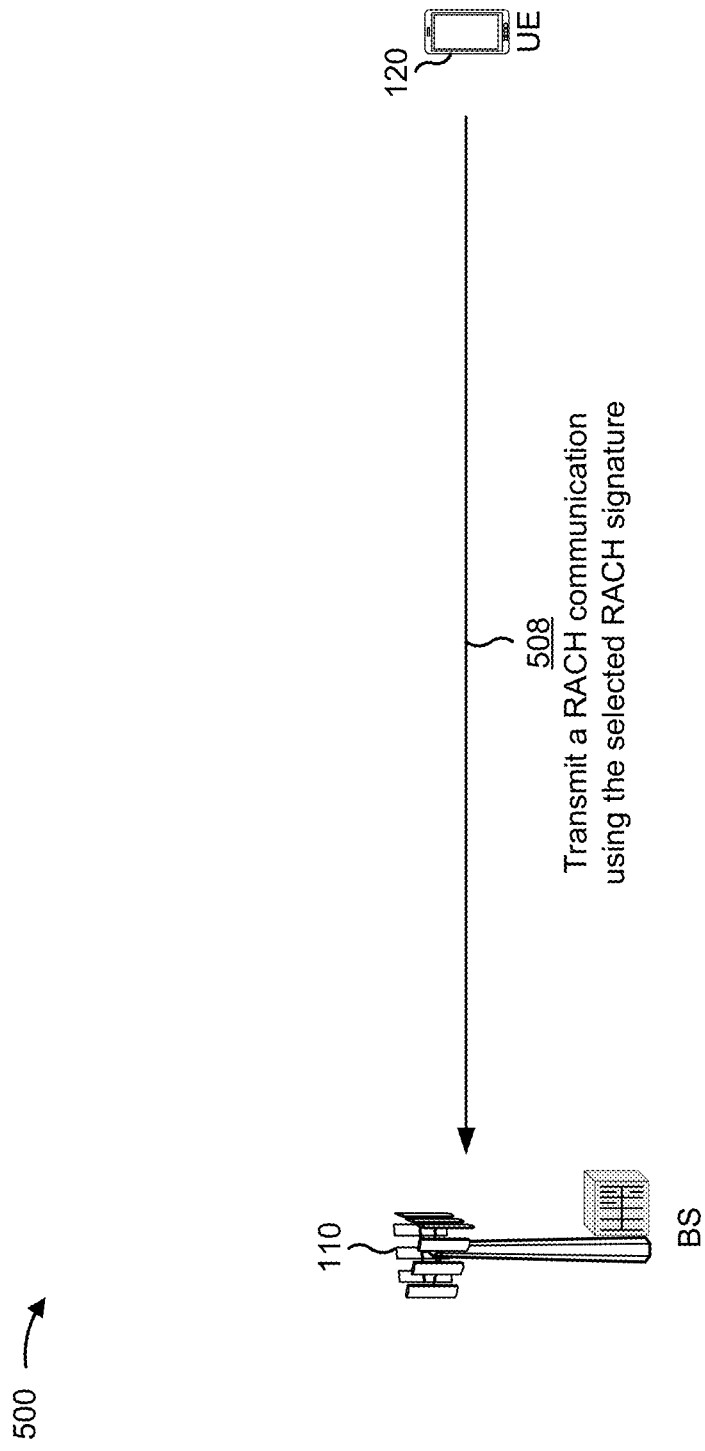

As shown in FIG. 5D, and by reference number 508, UE 120 may transmit the RACH communication using the selected RACH signature. For example, UE 120 may transmit the RACH communication in the RACH occasion associated with the selected RACH signature and may include, in the RACH communication, the RACH preamble associated with the selected RACH signature.

In this way, BS 110 may transmit a signaling communication that indicates respective sets of one or more RACH signatures associated with a plurality of SSBs. The number of RACH signatures for one or more RACH signatures associated with an SSB may be based at least in part on a beam type of a beam associated with the SSB. In this way, the number of RACH signatures associated with a particular SSB may be variable based at least in part on a beam type of a beam associated with the SSB. This may permit BS 110 to more flexibly and efficiently assign RACH signatures to SSBs, which may decrease RACH preamble collisions and/or increase utilization or RACH preambles.

As indicated above, FIGS. 5A-5D are provided as an example. Other examples may differ from what is described with respect to FIGS. 5A-5D.

FIG. 6 is a diagram illustrating an example process 600 performed, for example, by a UE, in accordance with various aspects of the present disclosure. Example process 600 is an example where a UE (e.g., UE 120) performs operations associated with variable RACH signature mapping.

As shown in FIG. 6, in some aspects, process 600 may include selecting a RACH signature from among one or more RACH signatures associated with an SSB, wherein a number of the one or more RACH signatures is based at least in part on a beam type associated with the SSB (block 610). For example, the UE (e.g., using receive processor 258, transmit processor 264, controller/processor 280, memory 282, and/or the like) may select a RACH signature from among one or more RACH signatures associated with an SSB, as described, for example, with reference to FIGS. 5A, 5B, 5C, and/or 5D. In some aspects, a number of the one or more RACH signatures is based at least in part on a beam type associated with the SSB.

As further shown in FIG. 6, in some aspects, process 600 may include transmitting, to a BS, a RACH communication using the selected RACH signature (block 620). For example, the UE (e.g., using receive processor 258, transmit processor 264, controller/processor 280, memory 282, and/or the like) may transmit, to a BS, a RACH communication using the selected RACH signature, as described, for example, with reference to FIGS. 5A, 5B, 5C, and/or 5D.

Process 600 may include additional aspects, such as any single implementation or any combination of aspects described below and/or in connection with one or more other processes described elsewhere herein.

In a first aspect, the beam type associated with the SSB comprises one of a plurality of beam types, each of the plurality of beam types associated with a beam width different from a beam width associated with any other beam type of the plurality of beam types. In a second aspect, alone or in combination with the first aspect, the plurality of beam types includes a narrow beam having a beam width in a given dimension, a wider beam having a beam width in the given dimension larger than the beam width of the narrow beam in the given dimension, and a widest beam having a beam width in the given dimension larger than the beam width of the wider beam in the given dimension.

In a third aspect, alone or in combination with one or more of the first or second aspects, the plurality of beam types includes at least one vertical beam having a relatively large elevation beam width and having a relatively small azimuth beam width and/or at least one horizontal beam having a relatively small elevation beam width and having a relatively large azimuth beam width. It is understood that, in the context of vertical or horizontal beams, that one dimension having relatively large beam width and the other dimension having relatively small beam width can, in some examples, refer to the relatively large beam width being larger than the relatively small beam width even if it may not be considered large in absolute terms. Similarly, the relatively small beam width can simply mean, in some examples, that it is smaller than the relatively large beam width even if not considered small in absolute terms. In some cases, the plurality of beam types can include at least one symmetric beam having equal or roughly equal elevation beam width and azimuth beam width.

In a fourth aspect, alone or in combination with one or more of the first through third aspects, the number of the one or more RACH signatures is based at least in part on a hierarchy associated with a plurality of beam types associated with the SSB. In a fifth aspect, alone or in combination with one or more of the first through fourth aspects, if the beam type associated with the SSB comprises a wide beam, the number of the one or more RACH signatures comprises a first number of RACH signatures. In a sixth aspect, alone or in combination with one or more of the first through fifth aspects, if the beam type associated with the SSB comprises a narrow beam, the number of the one or more RACH signatures comprises a second number of RACH signatures. In a seventh aspect, alone or in combination with one or more of the first through sixth aspects, the first number of RACH signatures is different from the second number of RACH signatures. In an eighth aspect, alone or in combination with one or more of the first through seventh aspects, the first number of RACH signatures is greater than the second number of RACH signatures.

In a ninth aspect, alone or in combination with one or more of the first through eighth aspects, the RACH signature comprises a RACH occasion and a RACH preamble. In a tenth aspect, alone or in combination with one or more of the first through ninth aspects, selecting the RACH signature comprises identifying an SSB index associated with the SSB, selecting the selected RACH occasion based at least in part on the SSB index, and selecting the selected RACH preamble from one or more RACH preambles for the RACH occasion. In an eleventh aspect, alone or in combination with one or more of the first through tenth aspects, identifying the SSB index comprises identifying the SSB index based at least in part on a bitmap included in a signaling communication transmitted from the BS. In a twelfth aspect, alone or in combination with one or more of the first through eleventh aspects, the signaling communication comprises at least one of an RRC communication, a MIB, a SIB, a RMSI communication, or an OSI communication.

In a thirteenth aspect, alone or in combination with one or more of the first through twelfth aspects, a number of RACH occasions associated with the SSB is indicated by a bit position, in the bitmap, associated with the SSB index. In a fourteenth aspect, alone or in combination with one or more of the first through thirteenth aspects, the beam type associated with the SSB is indicated by a bit position, in the bitmap, associated with the SSB index.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
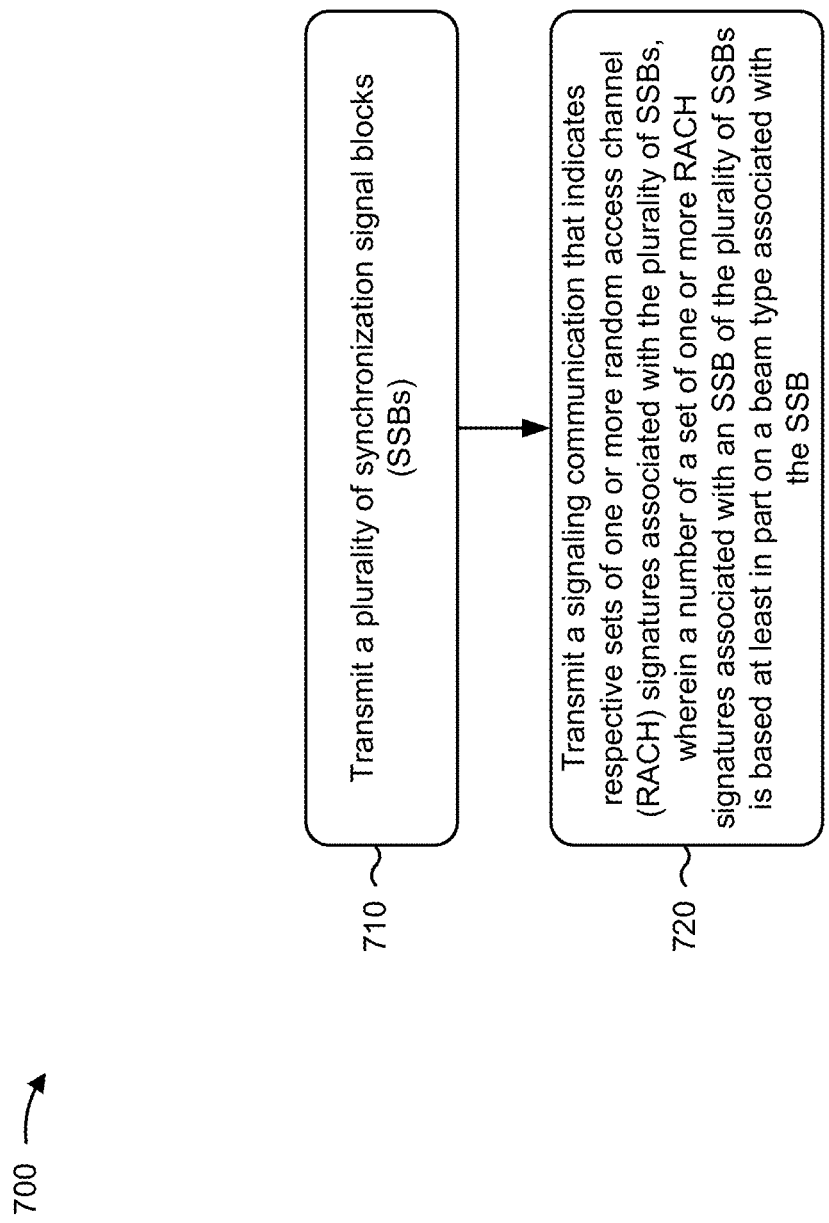
FIG. 7 is a diagram illustrating an example process performed, for example, by a BS, in accordance with various aspects of the present disclosure.

FIG. 7 is a diagram illustrating an example process 700 performed, for example, by a BS, in accordance with various aspects of the present disclosure. Example process 700 is an example where a BS (e.g., BS 110) performs operations associated with variable RACH signature mapping.

As shown in FIG. 7, in some aspects, process 700 may include transmitting a plurality of SSBs (block 710). For example, the BS (e.g., using transmit processor 220, receive processor 238, controller/processor 240, memory 242, and/or the like) may transmit a plurality of SSBs, as described, for example, with reference to FIGS. 5A, 5B, 5C, and/or 5D.

As further shown in FIG. 7, in some aspects, process 700 may include transmitting a signaling communication that indicates respective sets of one or more RACH signatures associated with the plurality of SSBs, wherein a number of a set of one or more RACH signatures associated with an SSB of the plurality of SSBs is based at least in part on a beam type associated with the SSB (block 720). For example, the BS (e.g., using transmit processor 220, receive processor 238, controller/processor 240, memory 242, and/or the like) may transmit a signaling communication that indicates respective sets of one or more RACH signatures associated with the plurality of SSBs, as described, for example, with reference to FIGS. 5A, 5B, 5C, and/or 5D. In some aspects, a number of one or more RACH signatures associated with an SSB of the plurality of SSBs is based at least in part on a beam type associated with the SSB.

Process 700 may include additional aspects, such as any single implementation or any combination of aspects described below and/or in connection with one or more other processes described elsewhere herein.

In a first aspect, the signaling communication comprises at least one of. In a second aspect, alone or in combination with the first aspect, an RRC communication, a MIB, a SIB, a RMSI communication, or OSI communication. In a third aspect, alone or in combination with one or more of the first or second aspects, the beam type associated with the SSB comprises one of a plurality of beam types, each of the plurality of beam types associated with a beam width different from a beam width associated with any other beam type of the plurality of beam types.

In a fourth aspect, alone or in combination with one or more of the first through third aspects, the plurality of beam types includes a narrow beam having a beam width in a given dimension, a wider beam having a beam width in the given dimension larger than the beam width of the narrow beam in the given dimension, and a widest beam having a beam width in the given dimension larger than the beam width of the wider beam in the given dimension. In a fifth aspect, alone or in combination with one or more of the first through fourth aspects, the plurality of beam types includes at least one vertical beam having a relatively large elevation beam width and having a relatively small azimuth beam width and/or at least one horizontal beam having a relatively small elevation beam width and having a relatively large azimuth beam width.

In a sixth aspect, alone or in combination with one or more of the first through fifth aspects, the number of the one or more RACH signatures is based at least in part on a hierarchy associated with a plurality of beam types associated with the SSB. In a seventh aspect, alone or in combination with one or more of the first through sixth aspects, if the beam type associated with the SSB comprises a wide beam, the number of the one or more RACH signatures associated with the SSB comprises a first number of RACH signatures, if the beam type associated with the SSB comprises a narrow beam, the number of the one or more RACH signatures associated with the SSB comprises a second number of RACH signatures. In an eighth aspect, alone or in combination with one or more of the first through seventh aspects, the first number of RACH signatures is different from the second number of RACH signatures. In a ninth aspect, alone or in combination with one or more of the first through eighth aspects, the first number of RACH signatures is greater than the second number of RACH signatures.

In a tenth aspect, alone or in combination with one or more of the first through ninth aspects, the one or more RACH signatures associated with the SSB comprise respective RACH occasions and respective RACH preambles. In an eleventh aspect, alone or in combination with one or more of the first through tenth aspects, the respective RACH occasions are indicated by a bitmap in the signaling communication. In a twelfth aspect, alone or in combination with one or more of the first through eleventh aspects, the respective RACH occasions are based at least in part on a bit position, in the bitmap, associated with an SSB index that is associated with the SSB. In a thirteenth aspect, alone or in combination with one or more of the first through twelfth aspects, a number of RACH occasions, included in the respective RACH occasions, is based at least in part on a bit position, in the bitmap, associated with an SSB index that is associated with the SSB. In a fourteenth aspect, alone or in combination with one or more of the first through thirteenth aspects, the beam type associated with the SSB is indicated by a bit position, in the bitmap, associated with an SSB index that is associated with the SSB.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    selecting a random access channel (RACH) signature from among one or more RACH signatures associated with a synchronization signal block (SSB),
        wherein a number of the one or more RACH signatures is variable based at least in part on a beam type, of a plurality of beam types, associated with the SSB; and
    transmitting, to a base station (BS), a RACH communication using the selected RACH signature.

2. The method of claim 1, wherein each of the plurality of beam types is associated with a beam width different from a beam width associated with any other beam type of the plurality of beam types.

3. The method of claim 2, wherein the plurality of beam types includes a narrow beam having a beam width in a given dimension, a wider beam having a beam width in the given dimension larger than the beam width of the narrow beam in the given dimension, and a widest beam having a beam width in the given dimension larger than the beam width of the wider beam in the given dimension.

4. The method of claim 2, wherein the plurality of beam types includes at least one vertical beam having a relatively large elevation beam width and having a relatively small azimuth beam width, at least one horizontal beam having a relatively small elevation beam width and having a relatively large azimuth beam width, and/or at least one symmetric beam having equal elevation beam width and azimuth beam width.

5. The method of claim 1, wherein the number of the one or more RACH signatures is based at least in part on a hierarchy associated with the plurality of beam types.

6. The method of claim 1, wherein, if the beam type associated with the SSB comprises a wide beam, the number of the one or more RACH signatures comprises a first number of RACH signatures;
    wherein, if the beam type associated with the SSB comprises a narrow beam, the number of the one or more RACH signatures comprises a second number of RACH signatures; and
    wherein the first number of RACH signatures is different from the second number of RACH signatures.

7. The method of claim 6, wherein the first number of RACH signatures is greater than the second number of RACH signatures.

8. The method of claim 1, wherein the selected RACH signature comprises:
    a RACH occasion and a RACH preamble; and
        wherein selecting the selected RACH signature comprises:
            identifying an SSB index associated with the SSB;
            selecting the RACH occasion based at least in part on the SSB index; and
            selecting the RACH preamble from one or more RACH preambles for the RACH occasion.

9. The method of claim 8, wherein identifying the SSB index comprises:
    identifying the SSB index based at least in part on a bitmap included in a signaling communication transmitted from the BS.

10. The method of claim 9, wherein the signaling communication comprises at least one of:
    a radio resource control (RRC) communication,
    a master information block (MIB),
    a system information block (SIB),
    a remaining minimum system information (RMSI) communication, or
    an other system information (OSI) communication.

11. The method of claim 9, wherein a number of RACH occasions associated with the SSB is indicated by a bit position, in the bitmap, associated with the SSB index.

12. The method of claim 9, wherein the beam type associated with the SSB is indicated by a bit position, in the bitmap, associated with the SSB index.

13. A method of wireless communication performed by a base station (BS), comprising:
    transmitting a plurality of synchronization signal blocks (SSBs); and
    transmitting a signaling communication that indicates respective sets of one or more random access channel (RACH) signatures associated with the plurality of SSBs,
        wherein a number of a set of one or more RACH signatures associated with an SSB of the plurality of SSBs is variable based at least in part on a beam type, of a plurality of beam types, associated with the SSB.

14. The method of claim 13, wherein the signaling communication comprises at least one of:
    a radio resource control (RRC) communication,
    a master information block (MIB),
    a system information block (SIB),
    a remaining minimum system information (RMSI) communication, or
    an other system information (OSI) communication.

15. The method of claim 13, wherein each of the plurality of beam types is associated with a beam width different from a beam width associated with any other beam type of the plurality of beam types.

16. The method of claim 15, wherein the plurality of beam types includes a narrow beam having a beam width in a given dimension, a wider beam having a beam width in the given dimension larger than the beam width of the narrow beam in the given dimension, and a widest beam having a beam width in the given dimension larger than the beam width of the wider beam in the given dimension.

17. The method of claim 15, wherein the plurality of beam types includes at least one vertical beam having a relatively large elevation beam width and having a relatively small azimuth beam width and/or at least one horizontal beam having a relatively small elevation beam width and having a relatively large azimuth beam width.

18. The method of claim 13, wherein the number of the one or more RACH signatures is based at least in part on a hierarchy associated with the plurality of beam types.

19. The method of claim 13, wherein, if the beam type associated with the SSB comprises a wide beam, the number of the one or more RACH signatures associated with the SSB comprises a first number of RACH signatures;
wherein, if the beam type associated with the SSB comprises a narrow beam, the number of the one or more RACH signatures associated with the SSB comprises a second number of RACH signatures; and
wherein the first number of RACH signatures is different from the second number of RACH signatures.

20. The method of claim 19, wherein the first number of RACH signatures is greater than the second number of RACH signatures.

21. The method of claim 13, wherein the one or more RACH signatures associated with the SSB comprise:
respective RACH occasions and respective RACH preambles,
wherein the respective RACH occasions are indicated by a bitmap in the signaling communication.

22. The method of claim 21, wherein the respective RACH occasions are based at least in part on a bit position, in the bitmap, associated with an SSB index that is associated with the SSB.

23. The method of claim 21, wherein a number of RACH occasions, included in the respective RACH occasions, is based at least in part on a bit position, in the bitmap, associated with an SSB index that is associated with the SSB.

24. The method of claim 21, wherein the beam type associated with the SSB is indicated by a bit position, in the bitmap, associated with an SSB index that is associated with the SSB.

25. A user equipment (UE) for wireless communication, comprising:
a memory; and
one or more processors operatively coupled to the memory, the memory and the one or more processors configured to:
select a random access channel (RACH) signature from among one or more RACH signatures associated with a synchronization signal block (SSB),
wherein a number of the one or more RACH signatures is variable based at least in part on a beam type, of a plurality of beam types, associated with the SSB; and
transmit, to a base station (BS), a RACH communication using the selected RACH signature.

26. The UE of claim 25, wherein, if the beam type associated with the SSB comprises a wide beam, the number of the one or more RACH signatures comprises a first number of RACH signatures;
wherein, if the beam type associated with the SSB comprises a narrow beam, the number of the one or more RACH signatures comprises a second number of RACH signatures; and
wherein the first number of RACH signatures is different from the second number of RACH signatures.

27. The UE of claim 26, wherein the first number of RACH signatures is greater than the second number of RACH signatures.

28. A base station (BS) for wireless communication, comprising:
a memory; and
one or more processors operatively coupled to the memory, the memory and the one or more processors configured to:
transmit a plurality of synchronization signal blocks (SSBs); and
transmit a signaling communication that indicates respective sets of one or more random access channel (RACH) signatures associated with the plurality of SSBs,
wherein a number of a set of one or more RACH signatures associated with an SSB of the plurality of SSBs is variable based at least in part on a beam type, of a plurality of beam types, associated with the SSB.

29. The BS of claim 28, wherein, if the beam type associated with the SSB comprises a wide beam, the number of the one or more RACH signatures associated with the SSB comprises a first number of RACH signatures;
wherein, if the beam type associated with the SSB comprises a narrow beam, the number of the one or more RACH signatures associated with the SSB comprises a second number of RACH signatures; and
wherein the first number of RACH signatures is different from the second number of RACH signatures.

30. The BS of claim 29, wherein the first number of RACH signatures is greater than the second number of RACH signatures.

* * * * *